(12) United States Patent
Huang

(10) Patent No.: US 7,113,084 B2
(45) Date of Patent: Sep. 26, 2006

(54) METHOD FOR LOCATING TIRE CONDITION SENSING APPARATUSES

(75) Inventor: Hao-Chin Huang, Kaohsiung (TW)

(73) Assignee: Lite-On Automotive Corp, Taiwan (CN)

( * ) Notice: Subject to any disclaimer, the term of this patent is extended or adjusted under 35 U.S.C. 154(b) by 214 days.

(21) Appl. No.: 10/938,651

(22) Filed: Sep. 13, 2004

(65) Prior Publication Data
US 2006/0055523 A1   Mar. 16, 2006

(51) Int. Cl.
B60C 23/00 (2006.01)

(52) U.S. Cl. .................. 340/445; 340/442; 73/146; 73/146.5

(58) Field of Classification Search ............... 340/445, 340/442, 443, 444, 447; 73/146, 146.2, 146.4, 73/146.5, 146.8
See application file for complete search history.

(56) References Cited

U.S. PATENT DOCUMENTS

| | | | |
|---|---|---|---|
| 6,034,597 A | 3/2000 | Normann et al. | |
| 6,501,372 B1 * | 12/2002 | Lin | 340/442 |
| 6,737,965 B1 * | 5/2004 | Okubo | 340/445 |
| 6,774,778 B1 | 8/2004 | Lin | |
| 6,879,252 B1 * | 4/2005 | DeZorzi et al. | 340/505 |
| 6,967,571 B1 * | 11/2005 | Tsujita | 340/447 |
| 6,972,691 B1 * | 12/2005 | Okubo | 340/870.07 |

FOREIGN PATENT DOCUMENTS

| | | |
|---|---|---|
| DE | 19631783 | 3/1998 |
| DE | 10241432 | 7/2003 |

* cited by examiner

Primary Examiner—Toan N. Pham
(74) Attorney, Agent, or Firm—Hoffman, Wasson & Gitler

(57) ABSTRACT

A method is disclosed for locating a plurality of tire condition sensing apparatuses mounted on a vehicle. At first, all of the antennas in the vehicle are maintained at an activation status for receiving and decoding a signal transmitted from one of tire condition sensing apparatuses of the tired, and a signal intensity is obtained. When a tire condition sensing apparatus is assured to continuously emit the signal, the antennas are alternatively turned on an off so as to obtain a plurality of signal intensity changes, and the tire condition sensing apparatus is located on the tire to which the antenna producing the maximum value of the signal intensity changes is corresponding.

18 Claims, 3 Drawing Sheets

METHOD FOR LOCATING TIRE CONDITION SENSING APPARATUSES

FIELD OF THE INVENTION

The present invention relates to a method for locating tire condition sensing apparatuses, and more particularly, to the locating method for automatically recognizing the locations of tire condition sensing apparatuses associated with a vehicle.

BACKGROUND OF THE INVENTION

Insufficient air pressure within a pneumatic tire of a vehicle at least will result in awkward driving, such as more gas consumption, lower tire endurability and shorter tire operation life, and even worse, will cause a flat tire which endangers passengers' life. A tire monitoring system can assist a driver at any time inside the car to check the tire conditions, such as tire pressure, tire temperature, etc., thereby effectively increasing the vehicle safety.

FIG. 1 schematically illustrates a vehicle 10 equipped with a conventional tire condition sensing system 11. The system 11 includes a plurality of tire condition sensing apparatuses 12, 14, 16 and 18 are installed on four respective tires, and antennas 22, 24, 26 and 28 are mounted on the positions of a vehicle main body adjacent to the tire condition sensing apparatuses 12, 14, 16 and 18 respectively, and the antennas 22, 24, 26 and 28 are connected to a receiver 30 (having a signal-receiving circuit) located in the vehicle main body. While in operation, each of the tire condition sensing apparatuses in turn emits a tire condition signal wirelessly. After the antennas 22, 24, 26 and 28 receive the signal, the signal is transmitted to the receiver 30, and then the driver is informed of the tire condition via a display apparatus (not shown).

When the receiver 30 receives the signal, the tire condition sensing system 11 has to fist distinguish the location of the tire condition sensing apparatus emitting the signal, so as to notify the driver that which tire the signal belongs to. Generally, with a conventional skill for recognizing the relative positions between the tire condition sensing apparatus and the tires, an operator has to perform the step of deflating and inflating the tires individually, so as to force each tire condition sensing apparatus to continuously emit the signal regarding tire condition due to the rapid pressure drop of each tire, and then the signal is decoded to obtain an identification code of one certain tire condition sensing apparatus, thus establishing the corresponding relationship between the tire condition sensing apparatuses and the tire locations. Therefore, while in operation, when the receiver receivers a signal, the identification code of the signal can be obtained after decoding, and then the location of the tire emitting the signal can be known via the aforementioned corresponding relationship between the tire condition sensing apparatuses and the tire locations.

However, the aforementioned conventional skill cannot be automatically performed, but needs manual operation. To deflate and inflate each individual tire is quite time-consuming, and the locations of tire condition sensing apparatuses have to be re-learned every time when the tires are replaced or switched. Thus, the conventional skill is quite inefficient and takes a lot of time and effort, so that the consumers' requirements cannot be satisfied.

Hence, there is an urgent need to develop a method for locating tire condition sensing apparatuses, thereby automatically recognizing the locations of tire condition sensing apparatuses and greatly shortening the recognition time, thus effective saving manpower and material resource, and meeting the consumers' requirements.

SUMMARY OF THE INVENTION

In accordance with one aspect, the present invention is to provide a method for locating tire condition sensing apparatuses, so as to automatically recognizing the locations of tire condition sensing apparatuses without manual operation.

In accordance with another aspect, the present invention is to provide a method for locating tire condition sensing apparatuses, so as to greatly shorten the time for distinguishing the tire condition sensing apparatuses with respect to tires.

According to the aforementioned aspects, a method for locating tire condition sensing apparatuses is provided for recognizing a plurality of tire condition sensing apparatuses mounted on a vehicle.

According to an embodiment of the present invention, the method for locating tire condition sensing apparatuses includes the following steps: providing a plurality of antennas, wherein the antennas are mounted on the locations near the tire condition sensing apparatuses; turning on all of the antennas; receiving and decoding a signal, wherein the signal includes an identification code belonging to a first tire condition sensing apparatus of the tire condition sensing apparatuses; determining if the signal is continuously emitted during a certain period of time and obtaining a first decision result; obtaining a signal intensity generated after the antennas commonly receive the signal, when the first decision result is yes; determining if the identification code belongs to the vehicle, and obtaining a second decision result; and performing a signal-locating step when the decision result is yes. The signal-locating step includes: rapidly turning on/off the antennas alternately so as to generate a plurality of signal intensity changes after the antennas commonly receive the signal, wherein the on or off status of each of the antennas is maintained for a certain period of time; comparing the signal intensity changes so as to obtain a maximum value; and determining the location of the first tire condition sensing apparatus which is emitting the signal, wherein the maximum value is generated while a first antenna of the antennas is being turned on/off, so that the first tire condition sensing apparatus is corresponding to the first antenna.

Hence, with the application of the present invention, the locations of tire condition sensing apparatuses can be automatically recognized without manual operation; the time for distinguishing the tire condition sensing apparatuses with respect to tires can be greatly shortened, thereby greatly saving manpower and material resource, thus satisfying consumers' requirements.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

The present invention is featured in rapidly turning on/off antennas in turns and obtaining a plurality of signal intensity changes when it is ascertained that a tire condition sensing apparatus is emitting a signal, wherein the antenna generating a maximum value of those signal intensity changes is located at the position to which the tire condition sensing apparatus emitting the signal is corresponding.

Figure 1:
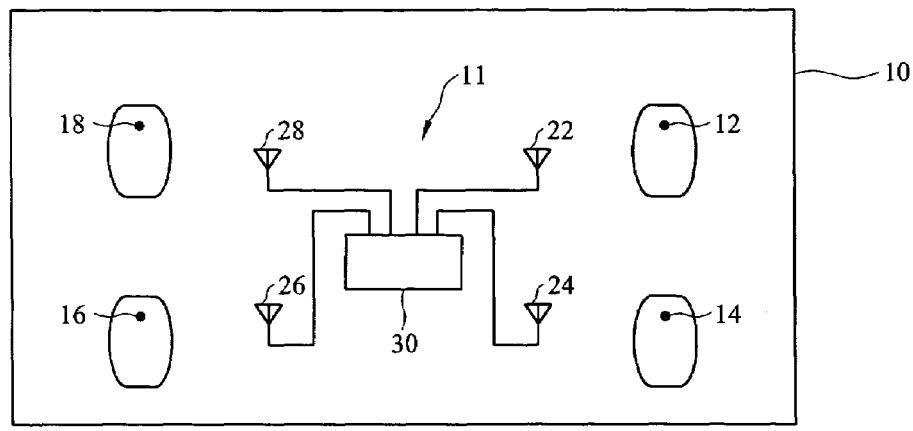
FIG. 1 is a schematic diagram showing the structure of a conventional tire condition sensing system.

The present invention can be applied to the tire condition sensing system as shown in FIG. 1. Hereinafter, FIG. 1 is merely used for conveniently explaining the method of the present invention for locating the tire condition sensing apparatuses, and yet the present invention is not limited thereto. The present invention is applicable to any vehicle (such as cars, motorcycles, etc.) having any number of tires (including spare tires).

Figure 2:
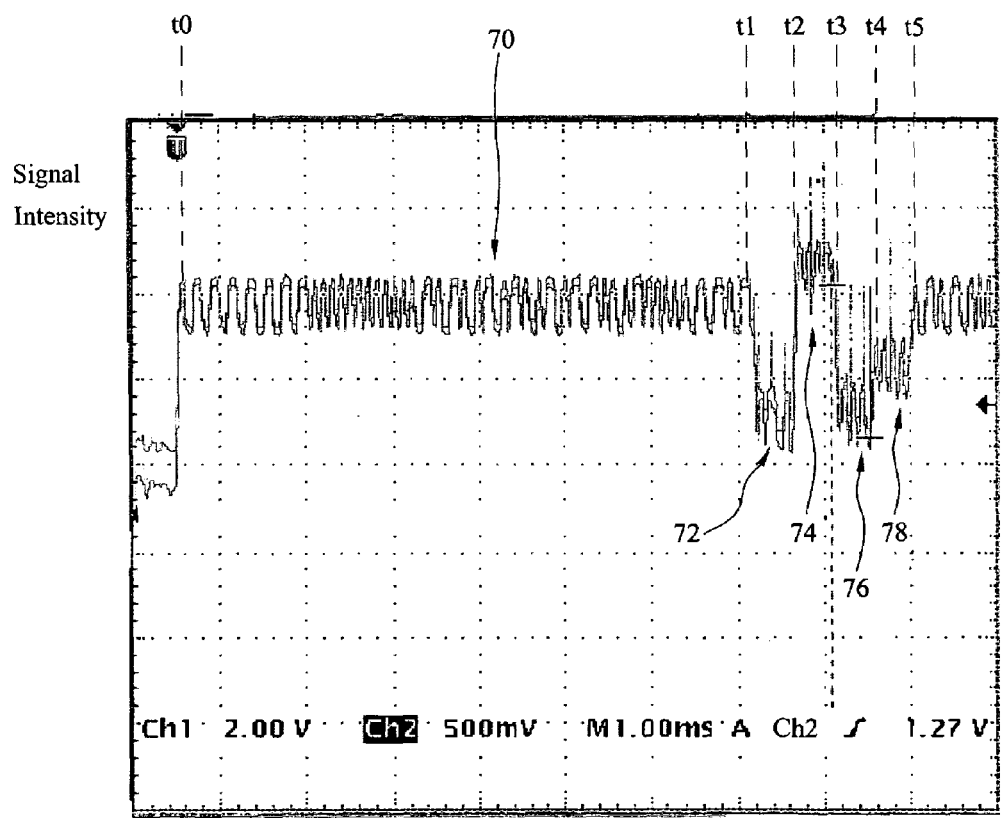
FIG. 2 is a schematic diagram showing a signal curve according to the method recited in an embodiment of the present invention for locating tire condition sensing apparatuses.

FIG. 2 is a schematic diagram showing a signal curve according to the method recited in an embodiment of the present invention for locating tire condition sensing apparatuses, wherein the tire condition sensing apparatuses 12, 14, 16 and 18 in turn periodically every one period of time (such as 1 minute) emit signals lasting a certain period of time (such as 10 ms). Such as shown in FIG. 2, at time t0, one tire condition sensing apparatus that is emitting a signal is found, and then the tire condition sensing system enters a locating mode. Between time t0 and time t1 (the period time thereof is called a third period of time hereinafter), the antennas 22, 24, 26 and 28 commonly receive a signal regarding one certain tire. After the signal is transmitted to the receiver 30, the signal is decoded. Since the signal includes an identification code of one tire condition sensing apparatus, it can be known from the identification code that the signal is being emitted by such as the tire condition sensing apparatus 14. However, at this time, since the system does not know which tire the tire condition sensing apparatus 14 is located on, the system cannot know which tire's condition has caused the signal to be generated.

Thereafter, the system determines if the signal is continuously emitted from time t0 to time t1, i.e. whether the receiver 30 has continuously received the signal in the aforementioned period of time (t0 to t1). If the result is yes, then the system obtains a first signal intensity (such as the signal average intensity of the signal curve 70 shown between to and t1) generated by the receiver 30 after the antennas 22, 24, 26 and 28 commonly receive the signal. Then, the system determines if the aforementioned identification code belongs to the system itself, i.e. whether the signal is emitted from the tire condition sensing apparatus of the vehicle on which the system is installed). If the identification code belongs to the system, then a signal-locating step is performed. At time t1, all of the antennas 22, 24, 26 and 28 are turned off, and then each of the antennas 22, 24, 26 and 28 are alternately first turned on and then off, and the on status of each antenna is maintained for a certain period of time (such as 0.44 ms). For example, after all of the antennas 22, 24, 26 and 28 are turned off, at time t1, the antenna 22 is turned on; and at time t2, the antenna 22 is turned off and the antenna 24 is turned on subsequently; and then at time t3, the antenna 24 is turned off and the antenna 26 is turned on subsequently; and at time t4, the antenna 26 is turned off and the antenna 28 is turned on subsequently; and thereafter, at time t5, all of the antennas 22, 24, 26 and 28 are turned on, wherein the intervals of t1, t2, t3, t4 and t5 are such as 0.44 ms. While the antennas are rapidly turned on/off in turns, the first signal intensity of the signal curve 70 will be changed to a plurality of second signal intensities of signal curves 72, 74, 76 and 78 accordingly. Thereafter, a plurality of signal intensity changes (differences) can be obtained by comparing each of the second signal intensities with the first signal intensity.

Then, these signal intensity changes are compared to obtain a maximum value, which is the signal curve 74, and the signal curve 74 is generated while the antenna 24 is turned on/off, meaning that the antenna 24 is nearest the tire condition sensing apparatus which is in the middle of emitting the signal. As the tire condition sensing apparatus must have the aforementioned identification code, and the identification code belongs to the tire condition sensing apparatus 14, the system can be aware that the tire condition sensing apparatus 14 is used to detect the condition of the tire corresponding to the antenna 24.

Thereafter, following time t5, the system will receive the signals respectively emitted by the tire condition sensing apparatuses 12, 16 and 18, and the system can recognize all of the locations of the respective tire condition sensing apparatuses 12, 16 and 18 after the steps described above are repeated.

It is worthy to be noted that the tire condition sensing apparatuses 12, 14, 16 and 18 take turns every such as 1 minute to emit signals lasting such as 10 ms. Hence, the present invention has to finish locating one tire condition sensing apparatus in 10 ms (such as from t0 to t1), and thus the signal-receiving circuit used in the present invention must have the feature of reflecting all the signals within such as 10 ms. Further, the antennas utilized in the present invention can be all of the same type and specification.

On the other hand, the signal-locating step according to the embodiment of the present invention also can be performed by first maintaining all of the antennas 22, 24, 26 and 28 at on status, and then rapidly first turning off and then on each of the antennas 22, 24, 26 and 28 in turns, wherein the off status of each antenna is maintained for a certain period of time (such as 0.44 ms). For example, at time t1, the antenna 22 is turned off; and at time t2, the antenna 22 is turned on and the antenna 24 is turned off subsequently; and then at time t3, the antenna 24 is turned on and the antenna 26 is turned off subsequently; and at time t4, the antenna 26 is turned on and the antenna 28 is turned off subsequently; and thereafter, at time t5, all of the antennas 22, 24, 26 and 28 are turned on, wherein the intervals of t1, t2, t3, t4 and t5 are such as 0.44 ms (the period time thereof is called a fourth period of time hereinafter). While the antennas are rapidly turned on/off in turns, the first signal intensity of the signal curve 70 will be weakened to second signal intensities accordingly. Thereafter, a plurality of signal intensity changes (differences) can be obtained by comparing each second signal intensity with the first signal intensity. Then, these signal intensity changes are compared to obtain a maximum value (having the biggest reduction), and it can be known that the tire corresponding to the antenna resulting in this maximum value is the area on which the tire condition sensing apparatus emitting the signal is located.

Figure 3A:
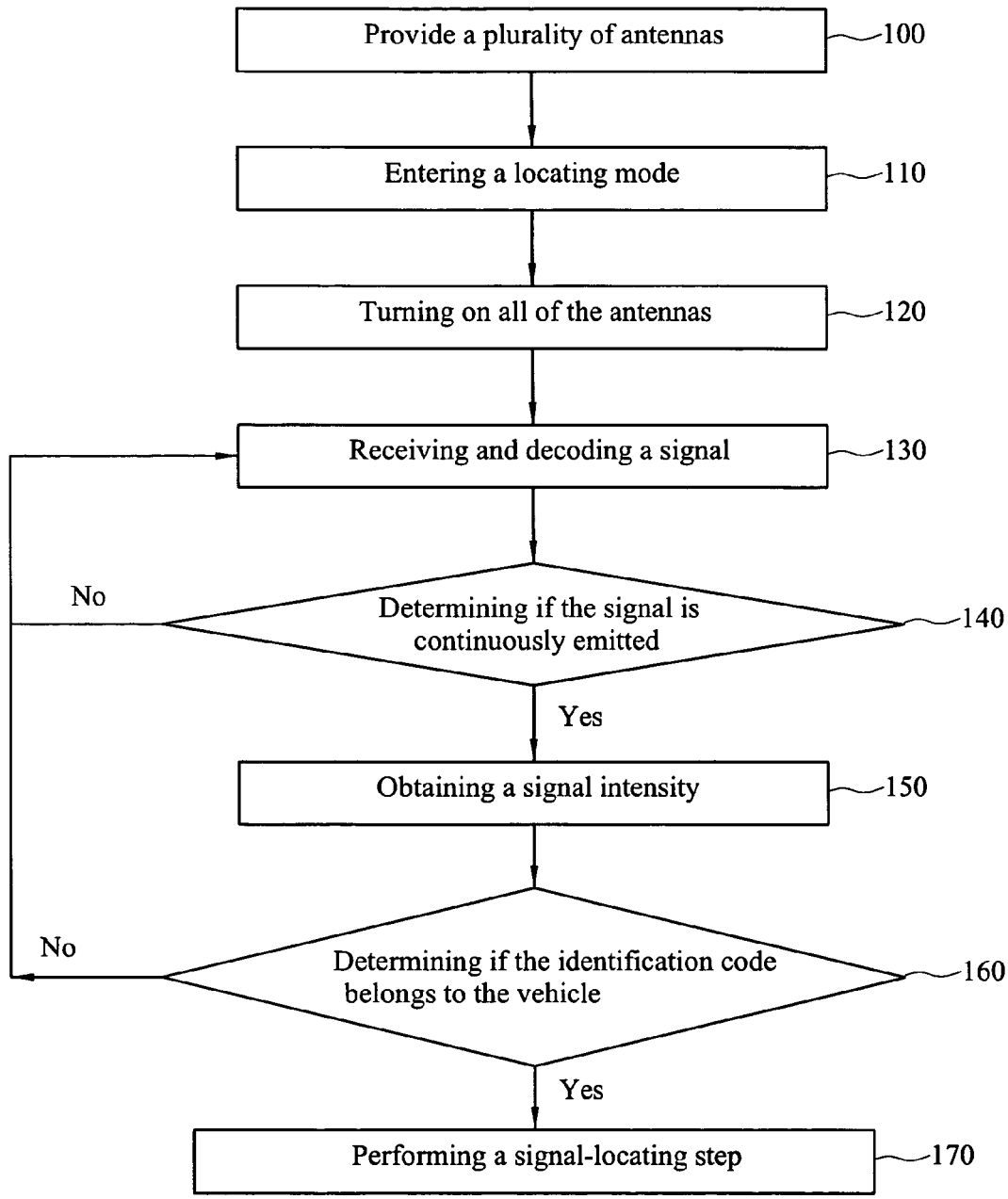
FIG. 3A is a schematic flow chart showing the method for locating tire condition sensing apparatuses according to the embodiment of the present invention.
Figure 3B:
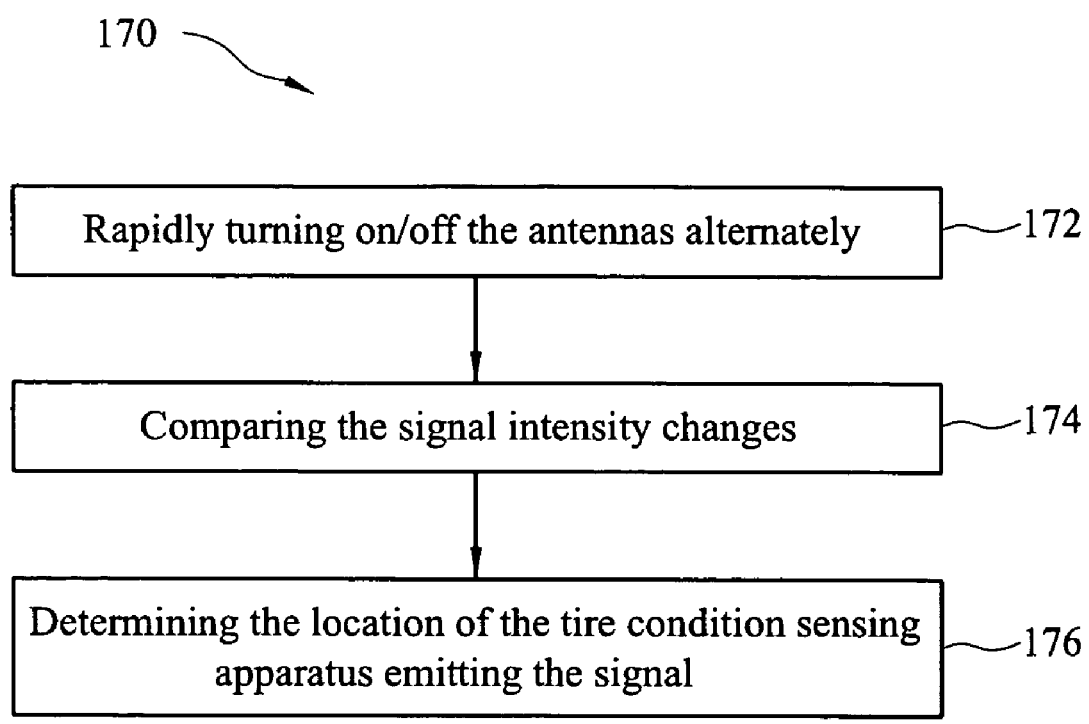
FIG. 3B is a schematic flow chart showing the signal-locating step according to the embodiment of the present invention.

FIG. 3A and FIG. 3B are schematic flow charts respectively showing the method for locating tire condition sensing apparatuses and the signal-locating step according to the embodiment of the present invention. Such as shown in FIG. 3A, at first, step 100 is performed to provide a plurality of antennas, wherein the antennas are mounted on the locations near the tire condition sensing apparatuses correspondingly, and the tire condition sensing apparatuses are installed on a vehicle. After the tire condition sensing system enters a locating mode (step 110), step 120 is performed to turn on all of the antennas. Then, step 130 is performed to receive and decode a signal, wherein the signal includes an identification code belonging to a first tire condition sensing apparatus of the tire condition sensing apparatuses. Thereafter, step 140 is performed to determine if the signal is continuously emitted, i.e. whether the signal is continuously emitted during a certain period of time. If the result of the step 140 is yes, step 150 is performed to obtain a signal intensity generated after the antennas commonly receive the signal (i.e. the signal received by the receiver). Step 160 is then performed to determine if the identification code belongs to the vehicle. If the result of the step 160 is yes, a signal-locating step 170 is performed. If the result of the step 140 or that of the step 160 are no, the system returns to step 130 for receiving and decoding a new signal continuously.

Such as shown in FIG. 3B, in the signal-locating step, step 172 is first performed to rapidly turn on/off the antennas alternately so as to generate a plurality of signal intensity changes after the receiver receives the signal, wherein the on or off status of each antenna is maintained for a certain period of time. Just as described above, before the signal-locating step 170 is performed, all of the antennas can be turned off first, and thereafter the antennas are alternately first turned on and then off, wherein the on status of each antenna is maintained for a certain period of time; or the antennas are maintained at on status, and thereafter the antennas are alternately first turned off and then on, wherein the off status of each antenna is maintained for a certain period of time.

Thereafter, step 174 is performed to compare the signal intensity changes so as to obtain a maximum value. Then, step 176 is performed to determine the location of the first tire condition sensing apparatus which is emitting the signal. Since the maximum value is generated while a first antenna of the antennas is being turned on/off, the first tire condition sensing apparatus is corresponding to the first antenna, i.e. the first tire condition sensing apparatus is in charge of detecting the tire corresponding to the first antenna. Thereafter, the above steps are repeated for several times so as to recognize the locations of all the tire condition sensing apparatuses.

Hence, it can be known from the aforementioned embodiments that the present invention has the following advantages. The locations of tire condition sensing apparatuses can be automatically recognized without using manual operation. The time for distinguishing the tire condition sensing apparatuses with respect to tires can be greatly shortened, so that manpower and material resource are greatly saved and consumers' requirements are satisfied.

As is understood by a person skilled in the art, the foregoing preferred embodiments of the present invention are illustrated of the present invention rather than limiting of the present invention. It is intended to cover various modifications and similar arrangements included within the spirit and scope of the appended claims, the scope of which should be accorded the broadest interpretation so as to encompass all such modifications and similar structure.

What is claimed is:

1. A method for locating tire condition sensing apparatuses, wherein said method is used for recognizing a plurality of tire condition sensing apparatuses mounted on a vehicle, said method comprising:
   providing a plurality of antennas, wherein said antennas are corresponding to said tire condition sensing apparatuses;
   turning on said antennas for receiving and decoding a signal emitted from one of said tire condition sensing apparatuses;
   generating a first signal intensity, wherein said signal includes an identification code belonging to said one of said tire condition sensing apparatuses emitting said signal;
   alternately turning on/off each of said antennas so as to obtain a plurality of second signal intensities;
   respectively comparing each of said second signal intensities with said first signal intensity so as to obtain a plurality of signal intensity changes;
   comparing said signal intensity changes so as to obtain a maximum value; and
   determining the location of said one of said tire condition sensing apparatuses which is emitting said signal, wherein said maximum value is generated while one of said antennas is being turned on/off, so that said one of said tire condition sensing apparatuses is corresponding to said one of said antennas.

2. The method for locating tire condition sensing apparatuses according to claim 1, further comprising:
   determining if said signal is continuously emitted during a third period of time and obtaining a decision result, wherein said step of generating said first signal intensity is performed when said decision result is yes.

3. The method for locating tire condition sensing apparatuses according to claim 2, wherein said tire condition sensing apparatuses in turn periodically every a first period of time emit signals lasting a second period of time.

4. The method for locating tire condition sensing apparatuses according to claim 3, wherein the sum of said third period of time and the operation time required for performing said step of alternately turning on/off each of said antennas is smaller than said second period of time.

5. The method for locating tire condition sensing apparatuses according to claim 2, wherein said step of turning on said antennas for receiving and decoding said signal is performed again when said decision result is no.

6. The method for locating tire condition sensing apparatuses according to claim 1, further comprising:
   determining if said identification code belongs to said vehicle, and obtaining a decision result, wherein said step of alternately turning on/off each of said antennas is performed when said decision result is yes.

7. The method for locating tire condition sensing apparatuses according to claim 6, wherein said step of turning on said antennas for receiving and decoding said signal is performed again when said decision result is no.

8. The method for locating tire condition sensing apparatuses according to claim 1, further comprising:
   entering a locating mode, wherein said step of turning on said antennas for receiving and decoding said signal is performed after said locating mode is set.

9. The method for locating tire condition sensing apparatuses according to claim 1, wherein before said step of alternately turning on/off each of said antennas is performed, all of said antennas are turned off first, and thereafter each of said antennas is first turned on and then off alternately, wherein the on status of each of said antennas is maintained for a fourth period of time.

10. The method for locating tire condition sensing apparatuses according to claim 1, wherein before said step of alternately turning on/off each of said antennas is performed, said antennas are maintained at on status, and thereafter each of said antennas is first turned off and then on alternately, wherein the off status of each of said antennas is maintained for a fourth period of time.

11. The method for locating tire condition sensing apparatuses according to claim 1, further comprising:
providing a signal-receiving circuit for reflecting said signal intensity changes.

12. The method for locating tire condition sensing apparatuses according to claim 1, wherein said antennas are all of the same type and specification.

13. A method for locating tire condition sensing apparatuses, wherein said method is used for recognizing a plurality of tire condition sensing apparatuses mounted on a vehicle, and said tire condition sensing apparatuses in turn periodically every a first period of time emit signals lasting a second period of time, said method comprising:
providing a plurality of antennas, wherein said antennas are mounted on the locations near said tire condition sensing apparatuses;
entering a locating mode;
turning on all of said antennas;
receiving and decoding a signal, wherein said signal includes an identification code belonging to a first tire condition sensing apparatus of said tire condition sensing apparatuses;
determining if said signal is continuously emitted during a third period of time and obtaining a first decision result;
obtaining a signal intensity generated after said antennas commonly receive said signal, when said first decision result is yes;
determining if said identification code belongs to said vehicle, and obtaining a second decision result; and
performing a signal-locating step when said decision result is yes, wherein said signal-locating step comprises:
rapidly turning on/off said antennas alternately so as to generate a plurality of signal intensity changes after said antennas commonly receive said signal, wherein the on or off status of each of said antennas is maintained for a fourth period of time, and the sum of said third period of time and the operation time required for performing said step of alternately turning on/off said antennas is smaller than said second period of time;
comparing said signal intensity changes so as to obtain a maximum value; and
determining the location of said first tire condition sensing apparatus which is emitting said signal, wherein said maximum value is generated while a first antenna of said antennas is being turned on/off, so that said first tire condition sensing apparatus is corresponding to said first antenna.

14. The method for locating tire condition sensing apparatuses according to claim 13, wherein said signal-locating step comprising:
first turning off all of said antennas; and
then alternately turning said antennas first on and then off, wherein the on status of each of said antennas is maintained for said fourth period of time.

15. The method for locating tire condition sensing apparatuses according to claim 13, wherein said signal-locating step comprising;
alternately turning said antennas first off and then on, wherein the off status of each of said antennas is maintained for said fourth period of time.

16. The method for locating tire condition sensing apparatuses according to claim 13, further comprising:
providing a signal-receiving circuit for reflecting said signal intensity changes within said fourth period of time.

17. The method for locating tire condition sensing apparatuses according to claim 13, wherein said antennas are all of the same type and specification.

18. The method for locating tire condition sensing apparatuses according to claim 13, wherein said antennas continue to receive said signal and said signal is decoded continuously, when said first decision result or said second decision result is no.

* * * * *